United States Patent Office 3,059,024
Patented Oct. 16, 1962

3,059,024
IMPROVED PROCESS FOR THE PREPARATION OF BETA-HYDROXYALKYL MONO-ESTERS OF ACRYLIC AND METHACRYLIC ACID
Albert I. Goldberg, Berkeley Heights, N.J., Joseph Fertig, New York, N.Y., and Henry Stanley, Newark, N.J., assignors to National Starch and Chemical Corporation, New York, N.Y., a corporation of Delaware
No Drawing. Filed July 10, 1961, Ser. No. 123,951
11 Claims. (Cl. 260—486)

This invention relates to a method for the production of beta-hydroxyalkyl mono-esters of acrylic and methacrylic acid. More particularly, this invention provides a novel catalytic system for the production of said esters by the reaction of the described carboxylic acids with ethylene or propylene oxide.

These esters have heretofore been produced by processes which suffer from decided limitations. In the past it has been the practice to prepare the esters of this invention by reacting the acid and an alkyene oxide in the presence of an alkali-alkaline earth metal salt catalyst under anhydrous conditions. This process results in a reaction product having a substantial amount of diester.

An improvement was the method wherein the esterification was catalyzed by certain tertiary amines. However, such a process requires an unusually long reaction period (24–48 hours). Finally, the esters which are obtained must be distilled before they can be used in polymerization reactions, since the presence of the amine catalyst complicates such reactions. Other hitherto known procedures are subject to various difficulties, which have tended to limit their effectiveness to the practitioner in his efforts to prepare these potentially useful reaction products.

It is an object of this invention to produce beta-hydroxyalkyl esters of acrylic and methacrylic acids by a method which prepares these esters at lower temperatures, with a minimum of undesirable side reactions, while providing higher conversion rates of acid and oxide to ester with lesser amounts of by-products being produced than with procedures heretofore known in the art. A further object is to provide a process for preparing such esters whereby they are extremely stable and free from contaminants thus facilitating their use in subsequent polymerization reactions.

We have now discovered an improvement in the reaction of acrylic and methacrylic acids and alkylene oxides. More specifically, the improvement comprises the use in said reaction of a catalyst comprising certain ammonium salts. Among the advantages of the novel process is that the resulting esters are obtained in a high yield in a state of unusually high purity, our catalyst system minimizing detrimental side reactions such as the formation of glycol diesters. In addition, the process of our invention permits the production of the esters at lower temperatures and with substantially higher conversion rates than has heretofore been possible.

As has been noted, in many of the prior known processes for preparing these esters, an undesirable side reaction often resulted in the formation of glycol diesters by the reaction of the hydroxyester and unreacted, unsaturated carboxylic acid. In addition to decreasing the yield of the desired mono-ester, these diesters decidedly limit the water solubility of these products. Moreover, the presence of these diesters renders these reaction products less useful as hydroxyl containing vinyl monomers since for most end uses of the polymerized beta-hydroxyalkyl unsaturated esters, it is desirable to obtain the latter polymers with a minimum of cross-linking. However, when present, the unsaturated diester acts as a cross-linking agent which during any subsequent polymerization reactions results in the formation of an insoluble, infusible reaction mass which often renders the product useless to the practitioner. In contrast, it is to be emphasized here that, as prepared by means of our process, these beta-hydroxyalkyl esters have particular utility in that they are completely water miscible and retain their ability to be further reacted to form homo- or copolymers without the danger of such undesirable cross-linking occurring.

The esters of this invention are the beta-hydroxyalkyl mono-esters of acrylic and methacrylic acids which are a class of materials useful, among other purposes, as monomers capable of being polymerized into homo- and copolymers. The alkylene oxides which may be employed in the process of our invention are ethylene and propylene oxides.

As for the novel catalytic agents which are operable in the process of our invention, these include simple and substituted ammonium halides corresponding to the formula:

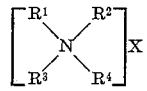

wherein X is an ion selected from the group consisting of chloride, bromide, fluoride and iodide, and $R^1$, $R^2$, $R^3$ and $R^4$ are each selected from the group consisting of hydrogen and hydrocarbon radicals from the group consisting of alkyl, aryl, and alkyl aryl radicals. Representative of the above described catalysts are tetramethylammonium chloride, tetramethylammonium bromide, tetraethylammonium bromide, phenyltrimethylammonium chloride and ammonium chloride.

We have found, surprisingly, that the use of these catalysts results in the preparation of beta-hydroxyalkyl esters of methacrylic and acrylic acid which are relatively free from the presence of undesirable diesters, containing no more than 0.3% diester, even when the final reaction mass contains as little as 0.2% of residual acid. The examples subsequently presented herein will further illustrate the unusual purity of our products. In contrast, it is to be noted that with heretofore employed processes, the presence of residual acid in such small amounts as is to be found in our materials would invariably be accompanied by the presence of significant quantities of diester. Or, conversely, where it was possible to cut down upon the amount of diester which was present, then the concentration of residual acid was, in turn, increased.

The above described catalysts may be used in a concentration of from 0.3 to 5.0%, as based upon the weight of the alpha, beta-unsaturated carboxylic acid present in the reaction mixture.

In general, the procedure for preparing the beta-hydroxyalkyl esters of our invention begins with the introduction into a reaction vessel of the catalyst together with the carboxylic acid and the alkylene oxide; the latter being present in a quantity amounting, preferably, to a 0.1 to 0.25 molar excess over the acid. After all of the reactants have been charged into the vessel, it is preferable to flush the reactor with an inert gas such as nitrogen or carbon dioxide so as to remove all traces of air and thereby introduce an inert atmosphere within the reactor. The latter procedure is, of course, well known in the art as a means for preventing any interaction between the air and the alkylene oxide.

Following the introduction of the inert atmosphere, agitation is initiated and the reaction mixture is heated to a temperature of from 45 to 120° C. and maintained at that temperature for a period of from 2 to 15 hours. Preferred reaction conditions are from 3 to 7 hours at 55° to 75° C. The reaction may, if desired, be carried out at normal room temperatures, but in such cases the reaction period is, of course, considerably longer and may require as much as several days to complete. In all cases, the reaction products are obtained as clear solutions which are completely miscible with water in all proportions.

In order to effectively stabilize the esters and minimize formation of diester during storage, it is necessary to remove any residual unreacted alkylene oxide which may be present in the reaction product. This may be accomplished by distillation or evaporation or by the bubbling of an inert gas, such as nitrogen, through the reaction mass.

It should also be noted that with acrylic acid, which readily undergoes homo- vinyl polymerization during the esterification reaction, it is preferable to add a small percentage of a suitable polymerization inhibitor when it is to be reacted with ethylene oxide in an inert atmosphere. As supplied commercially, this acid contains an inhibitor, usually about 0.05 to 0.1% of hydroquinone or its monomethyl ether. However, we have found that the use in our process of acrylic acid containing the above inhibitors or their equivalents does, nonetheless, result in some polymerization of this acid when it is reacted with ethylene oxide in an inert atmosphere. In order to effectively eliminate this reaction, we have discovered that it is possible to employ an inhibitor which is entirely devoid of active hydrogen atoms or an inhibitor which, while containing active hydrogen atoms, will still not be deactivated in an inert atmosphere by reaction with ethylene oxide. Apparently the presence of active hydrogen atoms in hydroquinone and its equivalents leads to their reaction with ethylene oxide under the oxygen free conditions which, as noted earlier, are preferable for the process of our invention. By thus reacting with alkylene oxide, the hydroquinone inhibitors appear to be effectively removed from the reaction mass which thereby allows for the undesirable homo- vinyl polymerization of the acrylic acid.

Applicable inhibitors which are devoid of active hydrogen atoms and which may be used in our process include ortho and para benzoquinone, diphenoquinone, alpha and beta naphthoquinone, anthraquinone, toluiquinone, phenanthroquinone, chloranil, acenaphthenequinone, and dinitrobenzene. Inhibitors containing active hydrogen atoms which are nevertheless unaffected by reaction with ethylene oxide include trinitrophenol and trinitroaniline. In using these inhibitors, they may be added to the acrylic acid in a concentration of from 0.001 to 0.1% as based upon the total weight of the acid. Moreover, it should be noted that these inhibitors are effective in preventing polymerization even in the case of acrylic acid which already contains an inhibitor which would ordinarily allow the acrylic acid to undergo homo- vinyl polymerization under the reaction conditions of this invention.

It is to be emphasized that the use of these active-hydrogen free inhibitors constitutes an essential feature of our invention as it relates to the hydroxyethylation of acrylic acid in the presence of an inert atmosphere.

The following examples will more fully illustrate the embodiment of our invention. In these examples all parts given are by weight unless otherwise noted. Moreover, each of the reaction products described in these examples contained no more than 0.3% of diester, as based upon the weight of the respective beta-hydroxyalkyl ester of acrylic or methacrylic acid.

*Example I*

This example illustrates the preparation of beta-hydroxyethyl acrylate using tetramethylammonium chloride as the catalyst.

The following ingredients were charged into a reaction vessel equipped with means for mechanical stirring:

| | Parts |
|---|---|
| Acrylic acid | 12.5 |
| Tetramethylammonium chloride | 0.5 |
| Benzoquinone | 0.0006 |

After the air in the reaction vessel had been replaced by flushing with nitrogen, 2.5 parts of ethylene oxide were immediately added to the above described mixture and an additional 6 parts were then added, with stirring over a period of 4 hours while the reaction mixture was maintained at a temperature of 60° C. Heating and stirring were continued for an additional 6 hours thereby resulting in the formation of 21 parts of a reaction product containing 95% by weight, of beta-hydroxyethyl acrylate and 0.28%, by weight, of residual acrylic acid. This product was water miscible in all proportions. To complete the preparation, nitrogen was bubbled through the reaction product in order to expel residual ethylene oxide. It should be noted that when this latter step was omitted from the reaction procedure, the product developed water insoluble diester after standing for one week at room temperature.

In a repetition of the above described procedure, we substituted 0.005 part of the methyl ether of hydroquinone for benzoquinone and this resulted in the polymerization of the reaction mixture during the synthesis. In repeating the above described procedure, chloranil was substituted for the benzoquinone, on a weight for weight basis, and polymerization of the reaction mixture was fully inhibited.

*Example II*

This example illustrates the preparation of beta-hydroxyethyl methacrylate using tetramethylammonium bromide as the catalyst.

The following ingredients were charged into a reaction vessel equipped with means for mechanical stirring:

| | Parts |
|---|---|
| Methyacrylic acid | 43.0 |
| Tetramethylammonium bromide | 1.0 |
| Ethylene oxide | 25.0 |

After the air in the reaction vessel had been replaced by flushing with nitrogen, the above described mixture was heated, under agitation, for 7 hours at a temperature of 71° C. The resulting product contained 95%, by weight, of beta-hydroxyethyl methacrylate and 0.3%, by weight, of residual methacrylic acid. To complete the preparation, carbon dioxide was bubbled through the product so as to remove residual ethylene oxide. In a repetition of the above procedure, the residual ethylene oxide was allowed to remain in the reaction product and this, in turn, resulted in the formation of diester within a period of seven days.

*Example III*

This example illustrates the preparation of beta-hydroxypropyl acrylate using tetramethylammonium bromide as the catalyst.

The following ingredients were charged into a reaction vessel equipped with a reflux condenser and means for mechanical stirring:

| | Parts |
|---|---|
| Acrylic acid | 72.0 |
| Propylene oxide | 6.0 |
| Tetramethylammonium bromide | 2.5 |

The air in the reaction vessel was first replaced by flushing with nitrogen. Under agitation, an additional 58 parts of propylene oxide was then added to the above described mixture over a 4 hour period while the latter mixture was at a temperature of 65–70° C. At the conclusion of this period, the temperature of the mixture was maintained at 70° C. for an additional 14 hours. The resulting product contained 96%, by weight, of beta-hydroxypropyl acrylate and 0.6%, by weight, of residual acrylic acid. Residual propylene oxide was then removed from the reaction product by distillation under reduced pressure.

*Example IV*

This example illustrates the preparation of beta-hydroxyethyl acrylate using ammonium chloride as the catalyst and trinitrophenol as the vinyl polymerization inhibitor.

The following ingredients were charged into a reaction vessel equipped with means for mechanical stirring:

| | Parts |
|---|---|
| Acrylic acid | 25.0 |
| Ammonium chloride | 0.5 |
| Ethylene oxide | 17.0 |
| Trinitrophenol | 0.0025 |

The air in the reaction vessel was replaced by flushing with nitrogen. Under agitation, the reaction mixture was then heated for 10 hours at a temperature of 60° C. thereby resulting in the formation of a reaction product containing 92%, by weight, of beta-hydroxyethyl acrylate and 2.0%, by weight, of residual acrylic acid. Residual ethylene oxide was removed by bubbling nitrogen through the reaction product.

*Example V*

This example illustrates the preparation of beta-hydroxypropyl methacrylate using phenyltrimethylammonium chloride as the catalyst.

The following ingredients were charged into a reaction vesesl equipped with means for mechanical stirring:

| | Parts |
|---|---|
| Methacrylic acid | 85.0 |
| Propylene oxide | 70.0 |
| Phenyltrimethylammonium chloride | 4.0 |

The air in the reaction vessel was replaced by flushing with nitrogen. Under agitation, the reaction mixture was then heated for 15 hours at a temperature of 60° C. thereby resulting in the formation of a reaction product containing 91%, by weight, of beta-hydroxypropyl methacrylate and 2.1%, by weight, of residual methacrylic acid. Residual propylene oxide was removed by distillation.

Summarizing, our invention provides for the use of a new catalytic system and polymerization inhibiting techniques for the preparation of beta-hydroxylalkyl esters of acrylic and methacrylic acids and the reaction products thereby produced. By utilizing this system, it is possible for the practitioner to obtain a mono-ester reaction product substantially free from diester. Variations may be made in proportions, procedures and materials without departing from the scope of this invention which is limited only by the following claims.

We claim:

1. The process of preparing a beta-hydroxyalkyl monoester of an acid selected from the group consisting of acrylic and methacrylic acid comprising reacting said acid and an alkylene oxide selected from the group consisting of ethylene and propylene oxide in the presence of a catalyst having the formula:

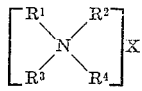

wherein X is an ion selected from the group consisting of chloride, bromide, fluoride and iodide, and $R^1$, $R^2$, $R^3$ and $R^4$ are each selected from the group consisting of hydrogen and hydrocarbon radicals from the group consisting of alkyl, aryl, and aryl alkyl radicals.

2. The process of claim 1, in which the alkylene oxide is present in an amount sufficient to provide a 0.1 to 0.25 molar excess over the amount of unsaturated carboxylic acid in the reaction mass.

3. The process of claim 1, in which the amount of said catalyst is from 0.3 to 5.0%, as based upon the weight of the unsaturated carboxylic acid.

4. The process of claim 1, in which residual unreacted alkylene oxide is removed from the final reaction product.

5. The method of claim 1, in which the reaction mass is heated at a temperature of from 45 to 120° C. for a period of from 2 to 15 hours.

6. The method for preparing beta-hydroxyethyl acrylate which comprises reacting (*a*) acrylic acid containing an inhibitor selected from the group consisting of ortho and para benzoquinone, diphenoquinone, alpha and beta naphthoquinone, anthraquinone, toluiquinone, phenanthroquinone, chloranil, acenaphthenequinone, dinitrobenzene, trinitrophenol and trinitroaniline; (*b*) ethylene oxide; and (*c*) an ammonium halide corresponding to the formula:

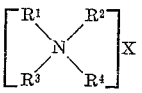

wherein X is an ion selected from the group consisting of chloride, bromide, fluoride, and iodide, and $R^1$, $R^2$, $R^3$ and $R^4$ are each selected from the group consisting of hydrogen and hydrocarbon radicals from the group consisting of alkyl, aryl, and aryl alkyl radicals.

7. The method of claim 6, in which said inhibitor is present in the acrylic acid in a concentration of from 0.001 to 0.1%, as based upon the total weight of the acid.

8. The method of claim 6, in which the reaction mass is heated at a temperature of from 45 to 120° C. for a period of from 2 to 15 hours.

9. The method of claim 6, in which said ethylene oxide is present in an amount sufficient to provide a 0.1 ot 0.25 molar excess over the amount of acrylic acid.

10. The method of claim 6, in which the amount of said ammonium halide is from 0.3 to 5.0%, as based upon the weight of the acrylic acid.

11. The process of claim 6, in which the residual unreacted ethylene oxide is removed from the final reaction product.

No references cited.